July 28, 1953 V. LUOMA 2,646,740
SOD CUTTING ATTACHMENT FOR GARDEN TRACTORS
Filed Jan. 4, 1952
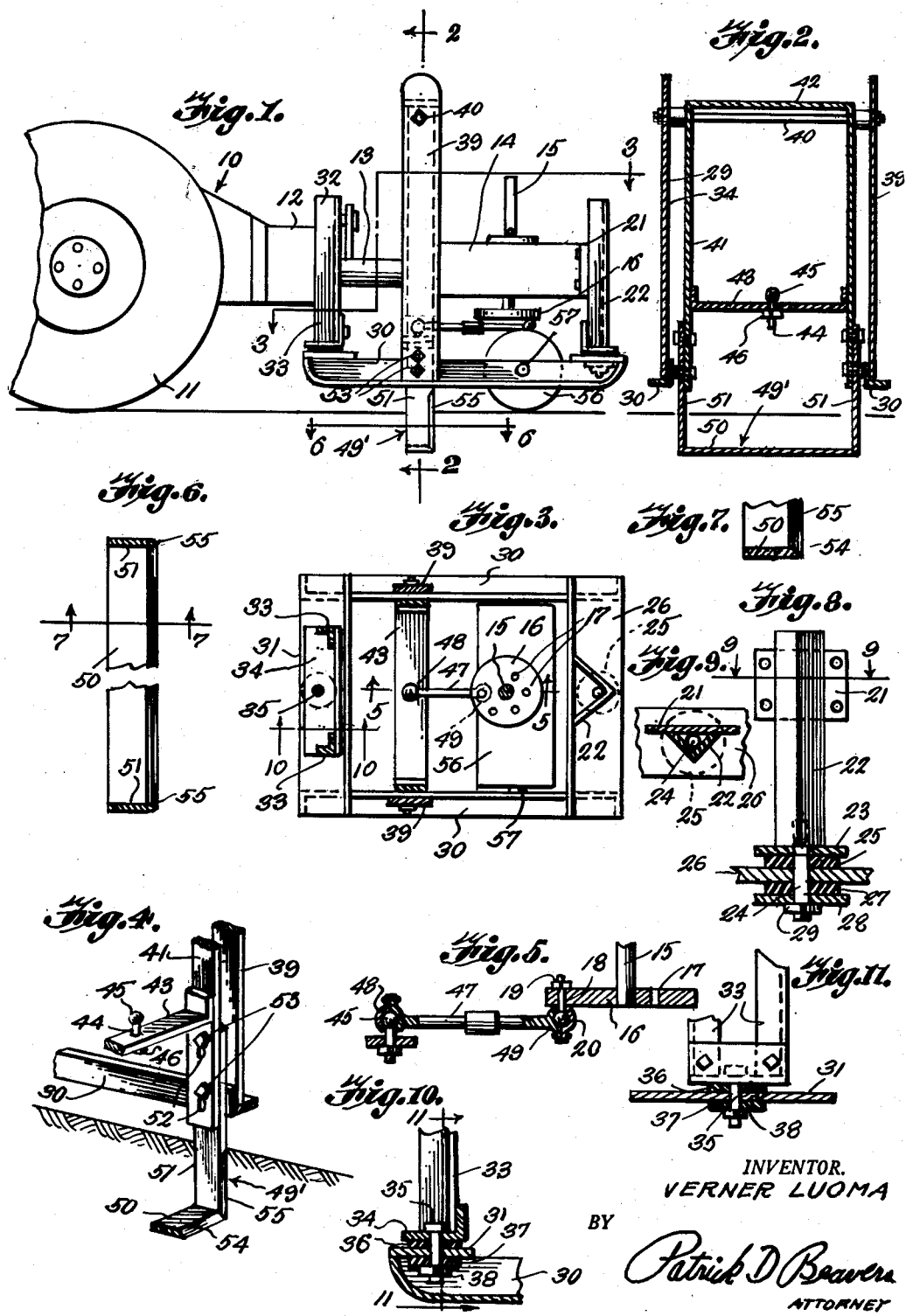
INVENTOR.
VERNER LUOMA
BY
Patrick D Beavers
ATTORNEY Patented July 28, 1953

2,646,740

UNITED STATES PATENT OFFICE 2,646,740

SOD CUTTING ATTACHMENT FOR GARDEN TRACTORS

Verner Luoma, Eveleth, Minn.

Application January 4, 1952, Serial No. 264,883

1 Claim. (Cl. 97—226)

The present invention relates to a sod cutting attachment for garden tractors and it consists in the combinations, constructions and arrangements of parts herein described and claimed.

Generally there is provided a sod cutting attachment which is adapted to be movably attached to a conventional garden tractor and which is adapted to continuously undercut and sidecut a strip of sod. There is provided a frame mounted upon a guide roller which latter is adapted to rest upon the ground and in the frame there is forwardly and rearwardly swingable a vertically adjustable U-shaped blade which is adapted to be reciprocated forwardly and rearwardly as the tractor moves forward by means of a connecting rod which is adjustably and eccentrically connected with a drive shaft of the tractor.

It is accordingly an object of the invention to provide a novel sod cutting attachment for garden tractors and the like.

Another object of the invention is to provide a device of the character set forth which is simple in construction, inexpensive to manufacture and yet effective and efficient in use.

A further object of the invention is the provision, in a device of the character set forth, of a novel blade forming a part of the invention.

Other and further objects of the invention will become apparent from a reading of the following specification taken in conjunction with the drawing, in which:

Figure 1 is a side elevational view of an embodiment of the invention,

Figure 2 is a sectional view taken along line 2—2 of Figure 1.

Figure 3 is a sectional view taken along line 3—3 of Figure 1,

Figure 4 is a fragmentary perspective view illustrating a blade and adjustable attaching means therefor which blade forms a part of the invention, Figure 5 is an enlarged fragmentary sectional view, partly in elevation, taken along line 5—5 of Figure 3, Figure 6 is a sectional view, partly broken away, taken along line 6—6 of Figure 1, Figure 7 is a fragmentary sectional view taken along line 7—7 of Figure 6.

Figure 8 is a fragmentary elevational view, partly in section, of a front mounting member forming a part of the invention, Figure 9 is a sectional view taken along line 9—9 of Figure 8, Figure 10 is an enlarged fragmentary sectional view taken substantially along line 10—10 of Figure 3, and Figure 11 is a fragmentary sectional view taken substantially along line 11—11 of Figure 10.

Referring more particularly to the drawing, there is shown therein a garden tractor generally indicated at 10 and having a pair of drive wheels 11 and a forwardly extending housing portion 12 from which projects a drive shaft 13 which extends to a gear reduction box 14 which is provided with a vertically extending driven shaft 15 which extends therethrough and which terminates at its lower end in a disc 16.

The disc 16 is provided with a plurality of vertically extending openings 17 each of which is at a different distance from the shaft 15 and through which is selectively extended a bolt 18 provided with a nut at its upper end, as indicated at 19 and provided with a spherical head 20 at its lower end.

Centrally affixed to the forward side of the housing 14 by means of a plate 21 is a vertically extending front standard 22 which is preferably formed of angle iron and which has affixed to its lower end a plate 23. A bolt 24 is affixed to the plate 23 and extends downwardly first through a rubber buffer 25 and then through a cross bar 26, thence through a rubber buffer 27 and finally a plate 28. A nut 29 is threaded upon the lower end of the bolt 24. The cross bar 26 forms the forward end of a cradle and has extending rearwardly from each side thereof a side bar 30 and has its forward ends interconnected by means of a rear crossbar 31. A yoke 32 is vertically adjustably mounted upon the member 12 and is provided with a pair of dependent spaced legs 33, each likewise preferably formed of angle iron and which are interconnected at their lower ends by means of a plate 34 which is interconnected with the cross bar 31 by a bolt 35 which extends downwardly therethrough and which has an upper rubber buffer 36 interposed between the plate 34 and the cross bar 31 and a lower buffer member 37 interposed between the cross bar 31 and a nut 38 which is threaded upon the end of the bolt 35.

Extending upwardly from each of the side bars 30 is a vertical standard 39 having a shaft 40 interconnecting the same adjacent the upper ends thereof. An inverted U-shaped blade-carrying frame 41 is swingably mounted upon the shaft 40 with its apex portion 42 lying immediately above and parallel to the shaft 40. Interconnecting the legs of the blade-carrying frame 41 adjacent their lower ends is a cross bar 43 which is centrally provided with a vertically extending bolt 44 having a spherical head 45 at its upper end and with a nut 46 threaded upon its lower end. A link rod 47 is provided with two-part sockets 48 and 49 at its respective ends for the reception therein of the heads 45 and 20, respectively.

A U-shaped blade is generally indicated at 49' and is provided with an apex portion 50 and a pair of upwardly extending legs 51. Each of the legs 41 is provided with a pair of vertically extending spaced slots 52 and each of the legs 51 has extending laterally therethrough a pair of bolts 53 which also extend through the slots 52 whereby to adjustably mount the blade 49' which latter is sharpened upon its apex portion only upon the forward upper side, as indicated at 54 and for a short distance upon both sides of each leg 51 extending upwardly from the apex portion 50, as indicated at 55.

In operation, it will be apparent that the device may be quickly and easily attached to the garden tractor 10 and that thereafter the cutting depth of the blade 49' may be adjusted by loosening the bolts 53 and vertically adjusting the blade 49' with respect to the legs 41 and the effective depth of the cut will be gauged by the apex portion 50 thereof with respect to a transversely extending roller 56 which is mounted upon an axle 57 extending between the side members 30. Thereafter, when the tractor is moved forwardly, it will be apparent that the blade 49' must first engage the ground and then travel downwardly to a depth permitted by the aforesaid adjustment and limited by the contact of the roller 56 with the ground. As the tractor moves forwardly it will also be seen that the blade will be reciprocated forwardly and rearwardly upon its shaft 40 by means of the revolving of the plate 16 thus causing a forward and rearward movement of the link 47. The size of the stroke of the blade in such reciprocatory action may be regulated by means of the selective placing of the bolt 18 in the openings 17.

While but one form of the invention has been shown and described herein, it will be readily apparent to those skilled in the art that many minor modifications may be made without departing from the spirit of the invention or the scope of the appended claim.

What is claimed is:

A device of the character described comprising a frame, means for attaching said frame to a tractor, a supporting roller mounted in the lower end of said frame, a U-shaped blade swingably mounted in said frame, and means for oscillating said blade, said blade being mounted immediately rearwardly of said roller, and said means for oscillating said blade including a vertical drive shaft carried by said frame, a disc mounted at the lower end of said shaft, said disc having a plurality of openings therethrough each at a different distance from said shaft, a cross bar associated with said blade, a bolt extending centrally through said cross bar, a bolt selectively mounted in one of said openings, and a connecting rod having ball and socket connection at each of its ends with said bolts.

VERNER LUOMA.

References Cited in the file of this patent

UNITED STATES PATENTS

| Number | Name | Date |
|---|---|---|
| 183,061 | Locke | Oct. 10, 1876 |
| 473,202 | Summers et al. | Apr. 19, 1892 |
| 1,706,831 | Watson | Mar. 26, 1929 |
| 2,164,246 | Kirkpatrick | June 27, 1939 |
| 2,345,425 | Phillips | Mar. 28, 1944 |